United States Patent
Nair et al.

(10) Patent No.: US 12,384,887 B2
(45) Date of Patent: Aug. 12, 2025

(54) EPOXY FUNCTIONALIZED POLY(ARYL ETHER SULFONES) COPOLYMERS

(71) Applicant: SOLVAY SPECIALTY POLYMERS USA, LLC, Alpharetta, GA (US)

(72) Inventors: Kamlesh Nair, Alpharetta, GA (US); Joel Pollino, Johns Creek, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 652 days.

(21) Appl. No.: 17/790,150

(22) PCT Filed: Jan. 4, 2021

(86) PCT No.: PCT/EP2021/050003
§ 371 (c)(1),
(2) Date: Jun. 30, 2022

(87) PCT Pub. No.: WO2021/140061
PCT Pub. Date: Jul. 15, 2021

(65) Prior Publication Data
US 2023/0092316 A1    Mar. 23, 2023

Related U.S. Application Data

(60) Provisional application No. 62/957,845, filed on Jan. 7, 2020.

(30) Foreign Application Priority Data

Mar. 6, 2020 (EP) .................................... 20161522

(51) Int. Cl.
*C08G 75/23* (2006.01)
*C08K 5/1515* (2006.01)
*C09D 181/06* (2006.01)

(52) U.S. Cl.
CPC ............ *C08G 75/23* (2013.01); *C08K 5/1515* (2013.01); *C09D 181/06* (2013.01)

(58) Field of Classification Search
CPC .................................................... C08G 75/23
See application file for complete search history.

(56) References Cited

U.S. PATENT DOCUMENTS

| | | |
|---|---|---|
| 4,883,845 A | 11/1989 | Stockinger et al. |
| 4,883,855 A | 11/1989 | Stockinger |
| 2007/0276062 A1 | 11/2007 | Tirelli et al. |
| 2011/0059385 A1 | 3/2011 | Kim et al. |
| 2014/0329973 A1 | 11/2014 | Axelrad et al. |
| 2016/0075850 A1 | 3/2016 | Weber et al. |
| 2019/0300653 A1 | 10/2019 | Green et al. |

FOREIGN PATENT DOCUMENTS

| | | |
|---|---|---|
| CN | 104245779 A | 12/2014 |
| CN | 105308095 A | 2/2016 |
| JP | 03160036 A | 7/1991 |
| JP | 05195316 A | 8/1993 |
| WO | 2008076637 A1 | 6/2008 |
| WO | 2020187684 A1 | 9/2020 |
| WO | 2021048229 A1 | 3/2021 |
| WO | 2021123405 A1 | 6/2021 |

OTHER PUBLICATIONS

Ni J. et al., "Crosslinked hybrid membranes based on sulfonated poly(ether ether ketone)/γ-methacryloxypropyltrimethoxysilane/phosphotungstic acid by an in situ sol-gel process for direct methanol fuel cells", J. Mater. Chem., Jan. 1, 2010, vol. 20, No. 30, pp. 6352-6358—DOI: 10.1039/C0JM00444H—The Royal Society of Chemistry.

Huang X. et al., "Synthesis and properties of side-chain-type ion exchange membrane PEEK-g-StSO3Na for bipolar membranes", Applied Surface Science, 2012, vol. 258, No. 7, pp. 2312-2318—DOI: 10.1016/J.APSUSC.2011.10.002—Elsevier B.V.

Ding F.C. et al., "Fabrication and properties of cross-linked sulfonated fluorene-containing poly(arylene ether ketone) for proton exchange membrane", Journal of Power Sources, May 30, 2007, vol. 170, No. 1, pp. 20-27—DOI: 10.1016/J.JPOWSOUR.2007.03.068—Elsevier B.V.

Vologirov A. K. et al., "Thermally cured sealants", Polymer Science Series D, Oct. 18, 2015, vol. 8, No. 4, pp. 275-279—DOI: 10.1134/S1995421215040188—Pleiades Publishing, Moscow.

Gindt B.P. et al., "Nanoporous polysulfone membranes via a degradable block copolymer precursor for redox flow batteries", Journal of Materials Chemistry A, Jan. 1, 2016, vol. 4, No. 11, pp. 4288-4295—DOI: 10.1039/C6TA00698A—The Royal Society of Chemistry.

U.S. Appl. No. 17/437,457, Kamlesh Nair, filed Sep. 9, 2021, US 2022-0162380 A1, WO 2020/187684A1.
U.S. Appl. No. 17/640,389, Kamlesh Nair, filed Mar. 4, 2022, WO 2021/048229A1.
U.S. Appl. No. 17/784,124, Kamlesh Nair, filed Jun. 10, 2022, WO 2021/123405A1.

*Primary Examiner* — Wenwen Cai
(74) *Attorney, Agent, or Firm* — Beatrice C. Ortego

(57) ABSTRACT

The invention pertains to a side-chain epoxy-functionalized copolymer (P1) and to the process for preparing this copolymer (P1). The present invention also pertains to the use of the copolymer (P1) in the preparation of a membrane, a composite material or a coating. The present invention also relates to a resin composition comprising at least the copolymer (P1) according to the present invention.

14 Claims, No Drawings

EPOXY FUNCTIONALIZED POLY(ARYL ETHER SULFONES) COPOLYMERS

CROSS-REFERENCE TO RELATED APPLICATIONS

This application is a U.S. national stage entry under 35 U.S.C. § 371 of International Application No. PCT/EP2021/050003 filed Jan. 4, 2021, which claims priority to U.S provisional application No. 62/957,845 filed on Jan. 7, 2020 and to European patent application No. 20161522.6 filed on Mar. 6, 2020, the whole content of these applications being incorporated herein by reference for all purposes.

TECHNICAL FIELD

The present invention pertains to a side-chain epoxy-functionalized copolymer (P1) and to the process for preparing this copolymer (P1). The present invention also pertains to the use of the copolymer (P1) in the preparation of a membrane, a composite material or a coating. The present invention also relates to a resin composition comprising at least the copolymer (P1) according to the present invention.

BACKGROUND ART

Poly(aryl ether sulfones) (PAES) polymers are highly thermally stable polymers with excellent toughness and impact strength. These resins are made by polycondensation reactions, typically using 4,4'-dichlorodiphenyl sulfone (DCDPS) along with other aromatic diols such as bisphenol A (BPA), 4,4'-biphenol (BP) or 4,4'-dihydroxydiphenylsulfone (DHDPS, also called bisphenol S or BPS).

PAES can be used as toughening agents in epoxy resin composites. The toughness or the impact properties of the composite can be enhanced by increasing the amount of PAES in the matrix. However, these polymers have poor solubility in the epoxy composite matrix, which makes difficult the incorporation of PAES polymers into epoxy composite matrix.

To overcome the above problem, PAES featuring reactive end groups, which possess a higher solubility than PAES as such, have been used to improve interfacial properties in epoxy resins. For example, US2014/329973 (Solvay) describes epoxy resin compositions comprising epoxy resins, one curing agent, one accelerator and at least two PAES polymers presenting distinct reactive end groups.

While such PAES presenting reactive end groups have been shown to have a better solubility and reactivity with the epoxy composite as compared to other PAES, there is a limit to which they can be added to the epoxy composite matrix, thereby limiting their beneficial effect in composite applications.

One object of the present invention is to further improve the impact properties and toughness of composite materials, by increasing the amount of PAES into the epoxy matrix. This object is solved by incorporating in the matrix of such composite materials the side-chain epoxy-functionalized PAES copolymer (P1), object of the present invention.

The preparation and use of side-chain functionalized poly(ether ether ketone) (PEEK) polymers are described in several articles.

The article of NI JING et al. (J. Mater. Chem, 2010, 20, 6352-6358) relates to crosslinked hybrid membranes based on sulfonated poly(ether ether ketone) (PEEK). This article describes the preparation of a copolymer comprising PEEK recurring units, some of them being sulfonated, starting from diallyl bisphenol A (daBPA), 4,4-Difluorobenzophenone (DFB) and 5,5-Carbonyl-bis(2-fluoro benzenesulfonate) (SDFR) and the preparation of membranes starting from this copolymer, as well as phosphotungstic acid (PWA) and 3-methacryloxypropyltrimethoxysilane (KH570).

The article of XUEHONG HUANG et al. (Applied Surface Science 258, 2012, 2312-2318) relates to the synthesis of side-chain-type ion exchange membrane. This article describes the preparation of a copolymer starting from DFB, bisphenol A and diallyl bisphenol A, and the grafting reaction of this copolymer is the presence of sodium sulfonic styrene and KH570.

The article of DING F C et al. (Journal of Power Sources 170, 2007, 20-27) relates to the fabrication of cross-linked sulfonated fluorene-containing PEEK for proton exchange membrane, using diallyl biphenol (daBP).

However these articles do not describe the copolymer of the present invention which comprises the structure described in details below.

SUMMARY OF INVENTION

A first aspect of the present disclosure is directed to a side-chain functionalized poly(aryl ether sulfones) (PAES) copolymer (P1). This copolymer (P1) comprises:
PAES recurring units ($R_{P1}$),
PAES recurring units with pendant epoxy groups ($R^*_{P1}$), more precisely PAES recurring units functionalized with epoxy side-chain groups.

The present invention also relates to a process for preparing these copolymers (P1) from a copolymer (P0) bearing allyl side-chains (i.e., unsaturated carbon-carbon double bonds functional groups). The present invention therefore provides a way to introduce epoxy side-chain functionality in the PAES polymers. The resulting copolymers can then be used in various applications, for example in composite materials in order to improve the mechanical properties (e.g., impact properties and toughness) of composite materials, coatings or chemical feedstock for further derivatization. Alternatively, the resulting copolymers can be further modified via an open-ring reaction so that the copolymers bear specific functional side-groups.

The present invention also relates to the use of such copolymer (P1) in the preparation of a membrane, a composite material or a coating.

DISCLOSURE OF THE INVENTION

The present chemistry can notably be used to increase the solubility of the PAES in certain materials (e.g., epoxy resins, polyurethane resins or unsaturated polyesters), as well as to increase the bonding between components in a composition of matter, for example comprising polymers and/or inorganic fillers (e.g., glass fibers). Increasing the interactions between the components of a composition improves the mechanical performance of the material, for example the polymeric component and the inorganic fillers in a composite material.

In the present application:
any description, even though described in relation to a specific embodiment, is applicable to and interchangeable with other embodiments of the present disclosure;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

Copolymer (P1)

In a first aspect, the present invention relates to an epoxy side-chain functionalized copolymer (P1).

This copolymer (P1) comprises at least two types of recurring units, namely recurring units ($R_{P1}$) of formula (M) and recurring units ($R^*_{P1}$) of formula (N), described below. The copolymer (P1) may also comprise hydroxyl, acid, or amine end groups, for example at least 50 µeq of hydroxyl, acid or amine end groups.

The functional groups of copolymer (P1) are internal functionalizations, within the copolymer backbone. The internal functionalizations result from a step-growth polymerization, in the presence of an allyl-substituted monomer, which advantageously makes the system versatile as the content of functionality can be adjusted by varying the content of allyl-substituted monomer in the reaction mixture. The allyl-substituted monomer comprises two pendant allyl group side chains which according to the present invention each comprises from 3 to 7 carbon atoms.

The copolymer (P1) of the present invention at least comprises:

recurring units ($R_{P1}$) of formula (M):

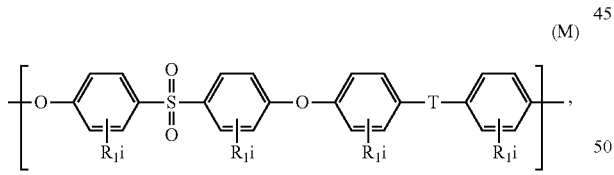

recurring units ($R^*_{P1}$) of formula (N):

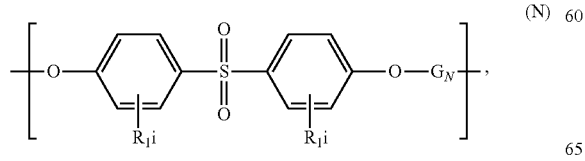

wherein $G_N$ is selected from the group consisting of at least one of the following formulas:

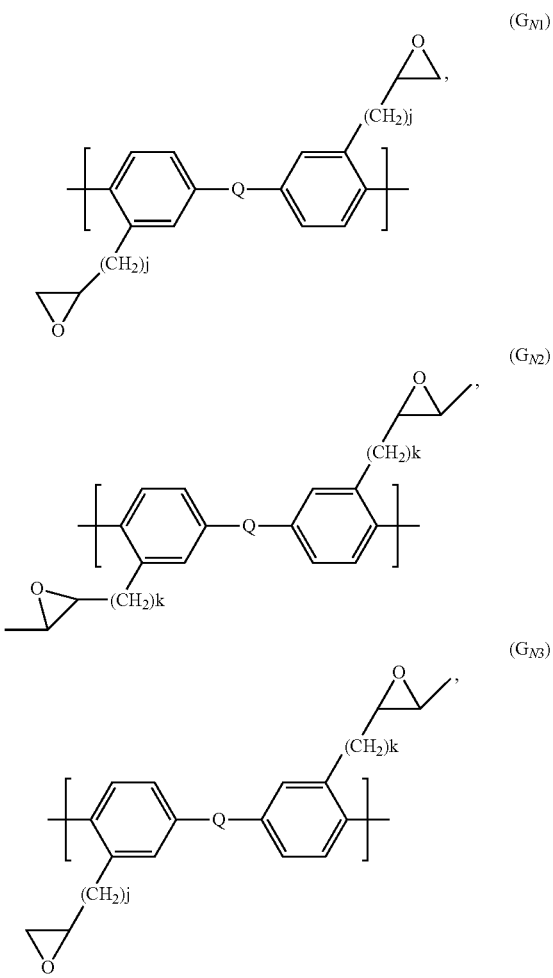

each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

each k is independently selected from 0 to 4;

each j is independently selected from 3 to 7; and

T and Q are independently selected from the group consisting of a bond, —$CH_2$—; —O—; —$SO_2$—; —S—; —C(O)—; —$C(CH_3)_2$—; —$C(CF_3)_2$—; —C(=$CCl_2$)—; —$C(CH_3)(CH_2CH_2COOH)$—; —N=N—; —$R_aC$=$CR_b$—, where each $R_a$ and $R_b$, independently of one another, is a hydrogen or a C1-C12-alkyl, C1-C12-alkoxy, or C6-C18-aryl group; —$(CH_2)_m$— and —$(CF_2)_m$— with m being an integer from 1 to 6; an aliphatic divalent group, linear or branched, of up to 6 carbon atoms; and combinations thereof.

The copolymer (P1) of the present invention is in the form of a racemate product. Due to the presence of the base and high temperature during polymerization, the allyl-substituted monomer usually racemizes during polymerization in such a way that the position of the double bond may change along the side chains. This leads to the formation of molecules differing from each other by the fact that the double bond may be at the end of the side chain or one carbon before the end of the side chain. The amount of racemization depends on the reaction time and temperature.

The copolymer (P1) of the present invention may preferably be such that it comprises at least 50 mol. % of recurring units ($R_{P1}$) of formula (M), based on the total number of moles of recurring units in the copolymer (P1), for example at least 55 mol. % or at least 60 mol. %.

The copolymer (P1) of the present invention may preferably comprise collectively at least 50 mol. % of recurring units ($R_{P1}$) and ($R^*_{P1}$), based on the total number of moles of recurring units in the copolymer (P1). The copolymer (P1) may for example comprise collectively at least 60 mol. %, at least 70 mol. %, at least 80 mol. %, at least 90 mol. %, at least 95 mol. %, at least 99 mol. % of recurring units ($R_{P1}$) and ($R^*_{P1}$), based on the total number of moles of recurring units in the copolymer (P1). The copolymer (P1) may even preferably consists essentially in recurring units ($R_{P1}$) and ($R^*_{P1}$).

In some embodiments, the copolymer (P1) is such that it comprises:

recurring units ($R^*_{P1}$) wherein the group $G_N$ is according to formula ($G_{N1}$), preferably at least 25 mol. % of the recurring units ($R^*_{P1}$) are such that the group GN is according to formula ($G_{N1}$), more preferably at least 30 mol. %, even more preferably 35 mol. %;

recurring units ($R^*_{P1}$) wherein the group $G_N$ is according to formulas ($G_{N1}$) and ($G_{N3}$), preferably at least 35 mol. % of the recurring units ($R^*_{P1}$) are such that the group $G_N$ is according to formula ($G_{N1}$) and ($G_{N3}$), more preferably at least 40 mol. %, even more preferably 45 mol. %; or at least recurring units ($R^*_{P1}$) wherein the group $G_N$ is according to formulas ($G_{N1}$), ($G_{N2}$) and ($G_{N3}$), preferably at least 50 mol. % of the recurring units ($R^*_{P1}$) are such that the group $G_N$ is according to formula ($G_{N1}$) and ($G_{N3}$), more preferably at least 60 mol. %, even more preferably 70 mol. %, 80 mol. % or 90 mol. %.

In some embodiments, the copolymer (P1) is such that T in recurring units ($R_{P1}$) is selected from the group consisting of a bond, —$SO_2$—, —$C(CH_3)_2$— and a mixture therefrom. The copolymer (P1) of the present invention may, for example, comprise recurring units ($R_{P1}$) in which T is —$C(CH_3)_2$— and recurring units ($R_{P1}$) in which T is —$SO_2$—.

T in recurring units ($R_{P1}$) is preferably —$C(CH_3)_2$—.

In some embodiments, the copolymer (P1) is such that Q in ($G_{N1}$), ($G_{N2}$) and/or ($G_{N3}$) of recurring units ($R^*_{P1}$) is selected from the group consisting of a bond, —$SO_2$—, —$C(CH_3)_2$— and a mixture therefrom.

In some preferred embodiments, $G_N$ is selected from the group consisting of at least one of the following formulas:

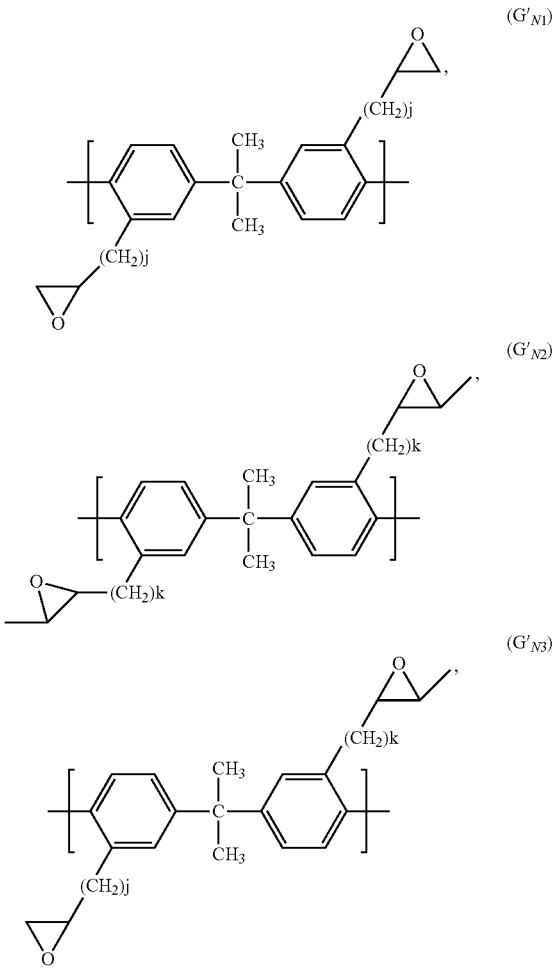

In some embodiments, the copolymer (P1) is such that each $R_1$ is independently selected from the group consisting of a C1-C12 moiety optionally comprising one or more than one heteroatoms; sulfonic acid and sulfonate groups; phosphonic acid and phosphonate groups; amine and quaternary ammonium groups.

In some embodiments, the copolymer (P1) is such that i is zero for each $R_1$ of recurring units ($R_{P1}$) and recurring units ($R^*_{P1}$).

In some embodiments, the copolymer (P1) is such that k is zero and j is 3 in recurring units ($R^*_{P1}$).

In some embodiments, the copolymer (P1) is such that the molar ratio of recurring units ($R_{P1}$)/recurring units ($R^*_{P1}$) varies between 0.01/100 and 100/0.01, preferably between 1/100 and 100/1, more preferably between 1/1 and 12/1, even more preferably between 4/1 and 10/1.

In some embodiments, the copolymer (P1) is such that recurring units ($R_{P1}$) are according to formula (M1):

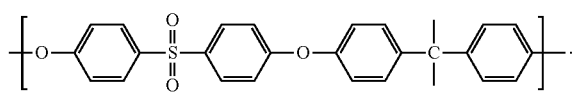

According to an embodiment, the copolymer (P1) of the present invention has a Tg ranging from 120 and 250° C., preferably from 170 and 240° C., more preferably from 180 and 230° C., as measured by differential scanning calorimetry (DSC) according to ASTM D3418.

The amount of the epoxy groups present on the copolymer (P1) may be determined according to known techniques. For example, the copolymer (P1) may be analysed by $^1$H-NMR analysis, or by hydrolysis of the epoxy groups and subsequent functionalization of the obtained hydroxyl groups by agent which are active to UV fluorescence analysis.

End Groups

The copolymer (P1) of the present invention may optionally comprises at least 50 μeq of hydroxyl end groups, amine end groups or acid end groups, for example at least 80 μeq of these end groups, at least 100 μeq, at least 150 μeq or even at least 200 μeq of these end groups. The copolymer (P1) may comprise less than 800 μeq of these end groups, for example less than 600 μeq.

The end groups are moieties at respective ends of the PAES copolymer chain.

Depending on the method used for making the copolymer (P1), and the possible use of an additional agent during the condensation process, for example an end-capping agent (e.g., aminophenol) or an protonating agent (e.g., oxalic acid), P1 may possess, for example, end groups derived from the monomers and/or end groups from derived from the end-capping agents. P1 is generally manufactured by a polycondensation reaction between a dihydroxy component and a dihalo component, so that the end groups usually include hydroxyl groups and halo-groups (such as chlorinated end groups or fluorinated end groups); however, when for example an end-capping agent such as aminophenol is used, the remaining halo-groups may be at least partially converted into amine end groups. The concentration of acid, amine and hydroxyl end groups can be determined by titration. The concentration of halogen groups can be determined with a halogen analyzer. Nevertheless, any suitable method may be used to determine the concentration of the end groups. For example, titration, NMR, FTIR or a halogen analyzer may be used.

According to an embodiment, the copolymer (P1) comprises at least 50 μeq/g of hydroxyl end groups (OH, μeq/g), for example at least 80 μeq of hydroxyl end groups, at least 100 μeq, at least 150 μeq or even at least 200 μeq of hydroxyl end groups.

According to an embodiment, the copolymer (P1) comprises at least 1.16 OH in 100 repeating units of the copolymer (P1), for example at least 1.86, at least 2.32 or at least 3.48 OH in 100 repeating units of the copolymer (P1).

According to an embodiment, the copolymer (P1) comprises at least 50 μeq/g of amine end groups (OH, μeq/g), for example at least 80 μeq of hydroxyl end groups, at least 100 μeq, at least 150 μeq or even at least 200 μeq of hydroxyl end groups.

According to an embodiment, the copolymer (P1) comprises at least 50 μeq/g of acid end groups (OH, μeq/g), for example at least 80 μeq of acid end groups, at least 100 μeq, at least 150 μeq or even at least 200 μeq of acid end groups.

Composition Comprising Copolymer (P1)

The present invention is directed to a composition comprising the copolymer (P1). The copolymer (P1) of the present invention may significantly improve the impact properties and toughness of compositions and materials, e.g., composite materials. Notably, due to its epoxy side chains, the amount of copolymer (P1) may be increased in the epoxy matrix, and then improves the composition mechanical properties such as impact resistance and toughness. The epoxy functionalization also favourably impacts the interactions with the fibers possibly present in such compositions and materials (e.g., with glass fibers or carbon fibers).

The composition of the present invention may further comprise:
- at least one polymer selected from the group consisting of poly(aryl ether ketone) (PAEK), poly(polyaryether sulfone) (PAES), polyamide (PA), polyester (PE), polyetherimide (PEI), poly(phenylene sulphide) (PPS) PPS, liquid crystal polymer (LCP), polycarbonate (PC), polyimide (PI) and polyamideimide (PAI), preferably PAES or PAEK, more preferably PAES,
- at least one resin selected from the group consisting of poly functional epoxy resins, polyurethanes, silicone resins and fluorinated resins, and/or
- at least one stabilizing agent (in order to avoid possible degradation of the copolymer (P1) during storage).

The copolymer (P1) may be present in the composition in a weight amount varying from 0.1 to 99.9 wt %, for example 1 to 98 wt, % or from 10 to 50 wt. %.

The stabilizing agent may be selected from sterically hindered phenols, sterically hindered amines (HALS), amine derivatives, dihydroquinoline derivatives, or mixtures thereof. Stabilizing agents are described in US 2007/0276062 A1, which is incorporated herein by reference. The stabilizing agent may be added in the composition in an amount varying from 0.01 wt. % to 10 wt. %, for example from 0.1 wt. % to 1 wt. %.

Process for Preparing Copolymer (P1)

The copolymer (P1) can be prepared by at least partial epoxidation of a copolymer (P0) using methods known in the art.

The epoxidized copolymer (P1) may contain from 0.1 mol % to 50 mol. % of epoxy groups, based on the total number of moles in the copolymer (P1), for example from 1 mol. % to 40 mol. %, from 2 mol. % to 30 mol. % or from 5 mol. % to 20 mol. %.

The functionalized PAES copolymer (P0) comprises:
recurring units ($R_{P0}$) of formula (M):

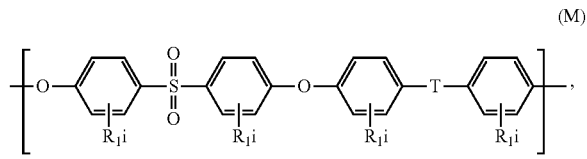

recurring units ($R^*_{P0}$) of formula (P):

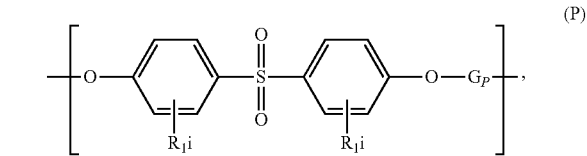

optionally at least 50 μeq of hydroxyl end groups, amine end groups, acid end groups or epoxy end groups,
wherein
each $R_1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is independently selected from 0 to 4;

$G_P$ is selected from the group consisting of at least one of the following formulas:

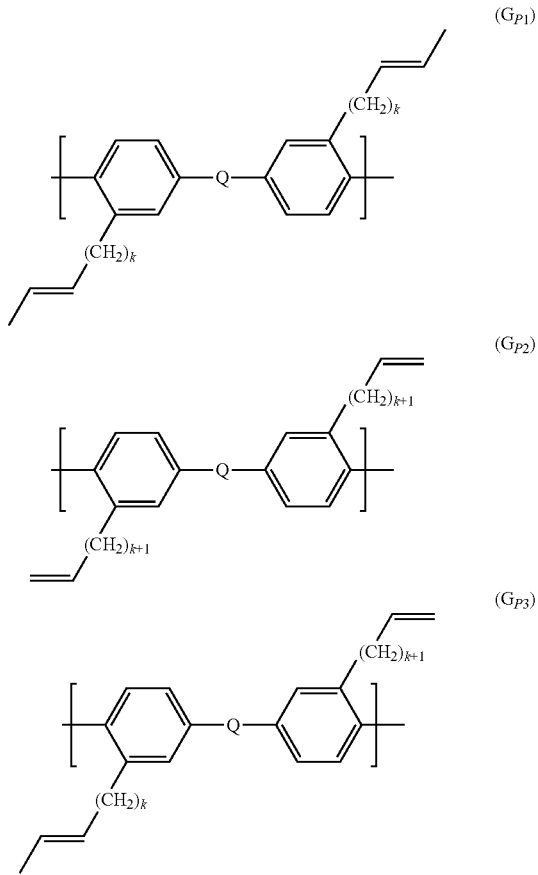

each k is independently selected from 0 to 4,

T and Q are independently selected from the group consisting of a bond, —$CH_2$—; —O—; —$SO_2$—; —S—; —C(O)—; —$C(CH_3)_2$—; —$C(CF_3)_2$—; —C(=$CCl_2$)—; —$C(CH_3)(CH_2CH_2COOH)$—; —N=N—; —$R_aC$=$CR_b$—, where each $R_a$ and $R_b$, independently of one another, is a hydrogen or a C1-C12-alkyl, C1 alkoxy, or C6-C18-aryl group; —$(CH_2)_m$— and —$(CF_2)_m$— with m being an integer from 1 to 6; an aliphatic divalent group, linear or branched, of up to 6 carbon atoms; and combinations thereof.

The copolymer (P0) may preferably be such that it comprises at least 50 mol. % of recurring units ($R_{P0}$) of formula (M), based on the total number of moles of recurring units in the copolymer (P0), for example at least 55 mol. % or at least 60 mol. %.

The copolymer (P0) may preferably comprise collectively at least 50 mol. % of recurring units ($R_{P0}$) and ($R*_{P0}$), based on the total number of moles in the copolymer (P0). The copolymer (P0) may for example comprise collectively at least 60 mol. %, or at least 70 mol. %, at least 80 mol. %, or at least 90 mol. %, or at least 95 mol. %, or at least 99 mol. % of recurring units ($R_{P0}$) and ($R*_{P0}$), based on the total number of moles in the copolymer (P0). The copolymer (P0) may even preferably consists essentially in recurring units ($R_{P0}$) and ($R*_{P0}$).

In some embodiments, the copolymer (P0) is such that T in recurring units ($R_{P0}$) is selected from the group consisting of a bond, —$SO_2$—, —$C(CH_3)_2$— and a mixture therefrom. The copolymer (P0) of the present invention may, for example, comprise recurring units ($R_{P0}$) in which T is —$C(CH_3)_2$— and recurring units ($R_{P0}$) in which T is —$SO_2$—.

T in recurring units ($R_{P0}$) is preferably —$C(CH_3)_2$—.

In some embodiments, the copolymer (P0) is such that Q in ($G_{P1}$), ($G_{P2}$) and/or ($G_{P3}$) of recurring units ($R*_{P0}$) is selected from the group consisting of a bond, —$SO_2$—, —$C(CH_3)_2$— and any mixture therefrom.

The ethylenic unsaturations are on the side chains of copolymer (P0), and optionally on the end groups. Consequently, the obtained epoxidized copolymer (P1) will contain epoxy groups in its side chain.

The amount of the epoxy groups present on the copolymer (P1) may be determined according to known techniques. For example, the copolymer (P1) may be analyzed by $^1$H-NMR analysis, or by hydrolysis of the epoxy groups and subsequent functionalization of the obtained hydroxyl groups by agent which are active to UV fluorescence analysis.

In the process for preparing the copolymer (P1), the at least partial epoxidation of the copolymer (P0) may be carried out:

in the presence of a peroxy acid, or with at least one hydrogen peroxide precursor and at least one carboxylic acid or derivative thereof in the presence of water.

In a first embodiment, the copolymer (P0) is subjected to an at least partial epoxidation reaction in the presence of a peroxy acid. In this embodiment, the copolymer (P0) is reacted with a suitable peroxy acid to randomly convert a fraction of the copolymer (P0) side chains carbon-carbon double bonds to oxirane rings. Suitable peroxy acids include meta-chloroperoxybenzoic acid (mCPBA) and the like. As an example, the copolymer (P0) may be treated with meta-chloroperoxybenzoic acid (mCPBA) in solution at reduced temperature (0° C.) for 6 hours in the presence of a catalyst. Alternately other epoxidizing agents such as magnesium monoperoxyphthalate hexahydrate, oxone, dimethyldioxirane or other organo-metallic catalysts (such as salen catalysts) can also be used.

In a second embodiment, the copolymer (P0), containing ethylenic unsaturation, is mixed with at least one hydrogen peroxide precursor and at least one carboxylic acid or derivative thereof in the presence of water for the at least partial epoxidation reaction of copolymer (P0). The term "hydrogen peroxide precursor" means a compound which, in the presence of water and/or by thermal decomposition, releases hydrogen peroxide.

According to this embodiment, the process for preparing copolymer (P1) comprises:

feeding at least one copolymer (P0) to a mixing device;

feeding at least one hydrogen peroxide precursor to said mixing device;

feeding at least one carboxylic acid or a derivative thereof to said mixing device;

mixing and reacting, in the presence of water, said at least one copolymer (P0), with said at least one hydrogen peroxide precursor and said at least one carboxylic acid or a derivative thereof, to obtain copolymer (P1).

The copolymer (P0) may be fed to the mixing device in a solid form (e.g., in granular form). Said at least one epoxidizing agent may be fed to the mixing device in a solid form (e.g., in granular form or in powder form). This process may be advantageously carried out in the presence of at least one non-ionic surfactant (in order to improve the dispersion of the epoxidizing agent and the carboxylic acid or derivative) and/or at least one stabilizing agent (in order to avoid possible degradation of the copolymer (P1) during storage). Said process may be carried out at a temperature of between 15° C. and 250° C., preferably of between 50° C. and 180° C. Said process may be carried out for a time of between 10 seconds and 30 minutes, preferably between 30 seconds and 20 minutes.

The hydrogen peroxide precursor may be selected from:
(a) inorganic persalts;
(b) metal peroxides;
(c) hydrogen peroxide adducts.

Specific examples of such hydrogen peroxide precursors are given in US 2007/0276062 A1, which is incorporated herein by reference.

Process for Preparing Copolymer (P2)

The copolymer (P1) of the present invention can be further modified into a copolymer (P2). The inclusion of side-chain epoxy groups in the copolymer (P1) offers the possibility to attach different functional groups on the copolymer via a ring-opening reaction. The compounds to be used to modify copolymer (P1) may be monofunctional and results in the modification of the side chains, or they may be polyfunctional and result in crosslinked structures. The skilled person in the art has access to multiple options, among which amines can be cited, and more precisely 1-hexylamine or hexamethylenetetramine (HMTA). Alternatively the use of a strong base (e.g., KOH) opens the epoxy rings and results in hydroxylated side chains.

Process for Preparing Copolymer (P0)

In some embodiments, the allyl/vinylene-functionalized copolymer (P0) used in the process of the present invention has been prepared by condensation of at least one aromatic dihydroxy monomer (a1), with at least one aromatic sulfone monomer (a2) comprising at least two halogen substituents and at least one allyl-substituted aromatic dihydroxy monomer (a3).

The condensation to prepare copolymer (P0) is preferably carried out in a solvent. When the condensation to prepare copolymer (P0) is carried out in a solvent, the solvent is for example a polar aprotic solvent selected from the group consisting of N-methylpyrrolidone (NMP), N-butylpyrrolidone (NBP), N,N dimethylformamide (DMF), 1,3-dimethyl-2-imidazolidinone (DMI), N,N dimethylacetamide (DMAC), 1,3-dimethyl-2-imidazolidinone, tetrahydrofuran (THF), dimethyl sulfoxide (DMSO), chlorobenzene and sulfolane. The condensation to prepare copolymer (P0) is preferably carried out in sulfolane or NMP.

The condensation to prepare copolymer (P0) may be carried out in the presence of a base, for example selected from the group consisting of potassium carbonate ($K_2CO_3$), potassium tert-butoxide, sodium hydroxide (NaOH), potassium hydroxide (KOH), sodium carbonate ($Na_2CO_3$), cesium carbonate ($Cs_2CO_3$) and sodium tert-butoxide. The base acts to deprotonate the components (a1) and (a3) during the condensation reaction.

The molar ratio (a1)+(a3)/(a2) may be from 0.9 to 1.1, for example from 0.92 to 1.08 or from 0.95 to 1.05.

In some embodiments, the monomer (a2) is a 4,4-dihalosulfone comprising at least one of a 4,4'-dichlorodiphenyl sulfone (DCDPS) or 4,4' difluorodiphenyl sulfone (DFDPS), preferably DCDPS.

In some embodiments, the monomer (a1) comprises, based on the total weight of the monomer (a1), at least 50 wt. % of 4,4' dihydroxybiphenyl (biphenol), at least 50 wt. % of 2,2-bis(4-hydroxyphenyl)propane (bisphenol A) or at least 50 wt. % of 4, 4' dihydroxydiphenyl sulfone (bisphenol S).

In some embodiments, the monomer (a3) comprises, based on the total weight of the monomer (a1), at least 50 wt. % of 2,2'-diallylbisphenol A (daBPA).

According to the principles of condensation polymerization to prepare copolymer (P0), the monomers of the reaction mixture are generally reacted concurrently. The reaction is preferably conducted in one stage. This means that the deprotonation of monomers (a1) and (a3) and the condensation reaction between the monomers (a1)/(a3) and (a2) takes place in a single reaction stage without isolation of the intermediate products.

According to an embodiment, the condensation is carried out in a mixture of a polar aprotic solvent and a solvent which forms an azeotrope with water. The solvent which forms an azeotrope with water includes aromatic hydrocarbons such as benzene, toluene, xylene, ethylbenzene, chlorobenzene and the like. It is preferably toluene or chlorobenzene. The azeotrope forming solvent and polar aprotic solvent are used typically in a weight ratio of from about 1:10 to about 1:1, preferably from about 1:5 to about 1:1. Water is continuously removed from the reaction mass as an azeotrope with the azeotrope forming solvent so that substantially anhydrous conditions are maintained during the polymerization. The azeotrope-forming solvent, for example, chlorobenzene, is removed from the reaction mixture, typically by distillation, after the water formed in the reaction is removed leaving the copolymer (P0) dissolved in the polar aprotic solvent.

The temperature of the reaction mixture to prepare copolymer (P0) is kept at about 150° C. to about 350° C., preferably from about 210° C. to about 300° C. for about one to 15 hours.

The inorganic constituents, for example sodium chloride or potassium chloride or excess of base, can be removed, before or after isolation of the copolymer (P0), by suitable methods such as dissolving and filtering, screening or extracting.

According to an embodiment, the amount of copolymer (P0) at the end of the condensation is at least 30 wt. % based on the total weight of the copolymer (P0) and the polar aprotic solvent, for example at least 35 wt. % or at least or at least 37 wt. % or at least 40 wt. %.

At the end of the reaction, the copolymer (P0) is separated from the other components (salts, base, . . . ) to obtain a solution. Filtration can for example be used to separate the copolymer (P0) from the other components. The solution can then be used as such for epoxidizing the copolymer (P0), or alternatively, the copolymer (P0) can be recovered from the solvent, for example by coagulation or devolatilization of the solvent.

Applications

The copolymer (P1) of the present invention may be used in the preparation of functional membranes. For example, these membranes may be hydrophobic, hydrophilic, bio-labeled, for example membranes with fluorescent tags.

The copolymer (P1) of the present invention may also be used in the preparation of composite materials. In this application, the functionalities improve the adhesion of the resin to the reinforcing fibers thereby improving performance.

The copolymer (P1) of the present invention may also be used in the preparation of functional coatings. Chemical moieties on the surface of the coatings can be selected to make the coating hydrophobic, hydrophilic, bio-taggable, anti-microbial, anti-fouling and/or UV curable.

Resin Compositions

The resin composition of the present invention may be an epoxy resin, a polyurethane resin or an unsaturated polyester resin. The composition comprises at least one copolymer (P1) as described above and an additional component which can for example be at least one epoxy compound and/or a curing agent (for example polyalkylenepolyamines, such as ethylene diamine (EDA), diethylene triamine (DETA), triethylene tetramine (TETA), tetraethylene pentamine (TEPA), and polyethylene polyamines (PEPA)).

The term "epoxy component" means a compound that contains more than one epoxy group, preferably two epoxy groups, per molecule. These epoxy compounds may be either saturated or unsaturated and aliphatic, cycloaliphatic, aromatic or heterocyclic and may also have hydroxyl groups. They are preferably glycidyl ethers which derive from polyhydric phenols, especially bisphenols or aminophenols and novolacs.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Raw Materials
  DCDPS (4,4'-dichlorodiphenyl sulfone), available from Solvay Specialty Polymers
  BPA (bisphenol A), available from Covestro, U.S.A.
  BP (biphenol), polymer grade available from Honshu Chemicals, Japan
  daBPA (2,2'-diallyl Bisphenol), available from Sigma-Aldrich, U.S.A.
  $K_2CO_3$ (Potassium Carbonate), available from Armand products
  3-chloroperoxy benzoic acid, available from Sigma-Aldrich, U.S.A.
  Methylene chloride, ethyl acetate, available from Sigma-Aldrich, U.S.A.
  Chlorobenzene, available from Sigma-Aldrich, U.S.A.
  NMP (2-methyl pyrrolidone), available from Sigma-Aldrich, U.S.A.

Test Methods
GPC—Molecular weight (Mn, Mw)

The molecular weights were measured by gel permeation chromatography (GPC), using methylene chloride as a mobile phase. Two 5µ mixed D columns with guard column from Agilent Technologies were used for separation. An ultraviolet detector of 254 nm was used to obtain the chromatogram. A flow rate of 1.5 ml/min and injection volume of 20 µL of a 0.2 w/v % solution in mobile phase was selected. Calibration was performed with 12 narrow molecular weight polystyrene standards (Peak molecular weight range: 371,000 to 580 g/mol). The number average molecular weight Mn, weight average molecular weight Mw, higher average molecular weight Mz, were reported.

Thermal Gravimetric Analysis (TGA)

TGA experiments were carried out using a TA Instrument TGA Q500. TGA measurements were obtained by heating the sample at a heating rate of 10° C./min from 20° C. to 800° C. under nitrogen.

$^1$H NMR $^1$H NMR spectra were measured using a 400 MHz Bruker spectrometer with TCE or DMSO as the deuterated solvent. All spectra are reference to residual proton in the solvent.

DSC

DSC was used to determine glass transition temperatures (Tg) and melting points (Tm)-if present. DSC experiments were carried out using a TA Instrument Q100. DSC curves were recorded by heating, cooling, re-heating, and then re-cooling the sample between 25° C. and 320° C. at a heating and cooling rate of 20° C./min. All DSC measurements were taken under a nitrogen purge. The reported Tg and Tm values were provided using the second heat curve unless otherwise noted.

I. Preparation of Allyl/Vinylene-Modified PSU Copolymer (P0-A)

The functionalized PSU copolymer (P0-A) was prepared according to the Scheme 1.

The copolymerization takes place in a glass reactor vessel (1 L) fitted with an overhead stirrer, nitrogen inlet and an overhead distillation set-up. The monomers DCDPS (287.16 g), BPA (216.88 g) and daBPA (15.76 g) are added to the vessel first, followed by the addition of $K_2CO_3$ (150.6 g), NMP (696 g).

The reaction mixture is heated from room temperature to 190° C. using a 1° C./min heating ramp. The temperature of the reaction mixture is maintained for 6 to 8 hours, depending upon the viscosity of the solution. The reaction is terminated by stopping the heating. The reaction mixture is filtered, coagulated into methanol and dried at 110° C.

The copolymer is in the form of a racemate product. Due to the presence of the base and high temperature during polymerization, the daBPA monomer racemizes during polymerization in such a way that the position of the double bond changes along the side chains. This leads to the formation of molecules differing from each other by the fact that the double bond may be at the end of the side chain or one carbon before the end of the side chain, as shown in Scheme 1.

Characterization
  GPC: Mn=26,430 g/mol, Mw=143,489 g/mol, PDI=5.43
  TGA: 485° C.
  DSC: 182.2° C.
  $^1$H NMR: The presence of unsaturated groups was confirmed by the appearance of a multiplet at 6.1-6.4 ppm which indicates the incorporation of the daBPA monomer in the polymer.

II. Preparation of Epoxy Functionalized PSU Copolymer (P1-A)

The functionalized PSU copolymer (P1-A) was prepared according to the following procedure according to Scheme 2.

The epoxy functionalization takes place in a glass reactor vessel (1 L) fitted with an overhead stirrer, nitrogen inlet. Copolymer P0-A (100 g) is dissolved at room temperature in dichloromethane (900 g). 3-chloroperoxybenzoic acid (11.71) was added at room temperature. The reaction is allowed to proceed for 48 hours. The reaction mixture is then filtered and coagulated in ethyl acetate. The coagulated copolymer is then washed with ethyl acetate and then dried at 110° C.

Characterization
- GPC: Mw=83,273 g/mol, Mn=15,325 g/mol, PDI=5.43
- TGA: 488° C.
- DSC: 109° C.
- $^1$H NMR: The total absence of unsaturated groups was confirmed by the complete disappearance of a multiplet at 6.1-6.4 ppm.
- FTIR: The presence of bands at ~900 cm$^{-1}$ indicates the presence of epoxy groups.

III. Preparation of Epoxy Functionalized PSU Copolymer (P1-B)

The epoxy functionalization takes place in a glass reactor vessel (1 L) fitted with an overhead stirrer, nitrogen inlet. Copolymer P0-B (147 g) is dissolved at room temperature in dichloromethane (900 g). 3-chloroperoxybenzoic acid (56 g) was added at room temperature. The reaction is allowed to proceed for 48 hours. The reaction mixture is then filtered and coagulated in ethyl acetate. The coagulated copolymer is then washed with ethyl acetate and then dried at 110° C.

Characterization
- GPC: Mn=27,443 g/mol, Mw=83,273 g/mol, PDI=3.03
- TGA: 468° C.
- DSC: 185° C.
- $^1$H NMR: The total absence of unsaturated groups was confirmed by the complete disappearance of a multiplet at 6.1-6.4 ppm.
- FTIR: The presence of bands at ~900 cm$^{-1}$ indicates the presence of epoxy groups.

IV. Preparation of Functionalized PSU Copolymer (P2-B$_1$)

The functionalized PSU copolymer (P2-B$_1$) was prepared according to the following procedure according to Scheme 3.

The ring-opening reaction takes place in a glass reactor vessel (1 L) fitted with an overhead stirrer, nitrogen inlet. Copolymer P1-B (10 g) is dissolved at room temperature in NMP (80 g). 1-hexylamine (837 mg) was added at room temperature. The reaction was heated to 80° C. and allowed to proceed overnight. The reaction mixture is then filtered and coagulated in ethyl acetate. The coagulated copolymer is then washed with ethyl acetate and then dried at 85° C. under vacuum.

Characterization
- GPC: Mn=26,136 g/mol, Mw=85,736 g/mol, PDI=3.28.
- TGA: This material had a distinct thermal degradation profile one at 200° C. (16.39% loss in weight which corresponds to degradation of the hexyl side-chains) and 488° C. which corresponds to the polysulfone main-chain.
- DSC: 151° C.
- FTIR: The presence of bands at 3,421 cm$^{-1}$ (indicating —OH groups), around 2,900 cm$^{-1}$ (indicating CH alkyl groups) indicate the presence of the hexyl side-chains.

V. Preparation of Functionalized PSU Copolymer (P2-B$_2$)

The functionalized PSU copolymer (P2-B$_2$) was prepared according to the following procedure according to Scheme 4.

The ring-opening reaction takes place in a glass reactor vessel (1 L) fitted with an overhead stirrer, nitrogen inlet. Copolymer P1-B (20 g) is dissolved at room temperature in NMP (80 g). KOH (1.4 g) dissolved in 10 g of water, was added at room temperature. The reaction was heated to 100° C. and allowed to proceed overnight.

The reaction mixture is then cooled and acidified with HCl until pH reaches 4 and then coagulated in ethyl acetate. The coagulated copolymer is then washed with ethyl acetate and then dried at 85° C. under vacuum.

Characterization
- GPC: Mn=9,110 g/mol, Mw=17,255 g/mol, PDI=1.89
- DSC: 1514 The resultant polymer was titrated for hydroxyl groups and the aliphatic hydroxyl content was found to be 66 µeq/g.
- DSC: 154° C.

Scheme 1 - Preparation of allyl/vinylene-modified PSU copolymer (P0-A)

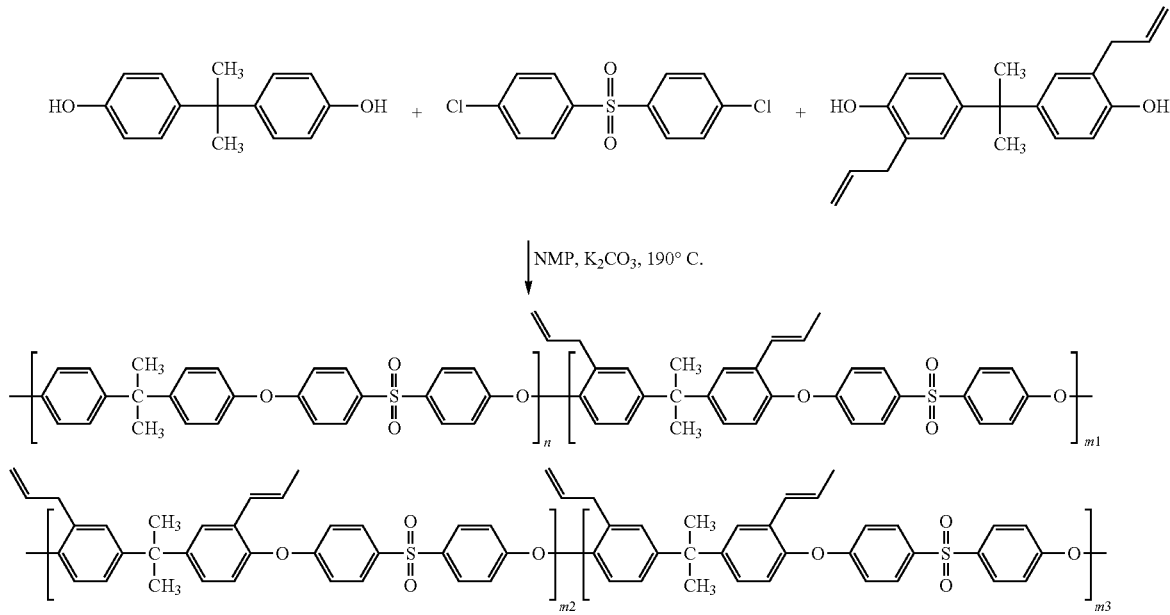

Scheme 2 - Preparation of epoxy functionalized PSU copolymer (P1-A)
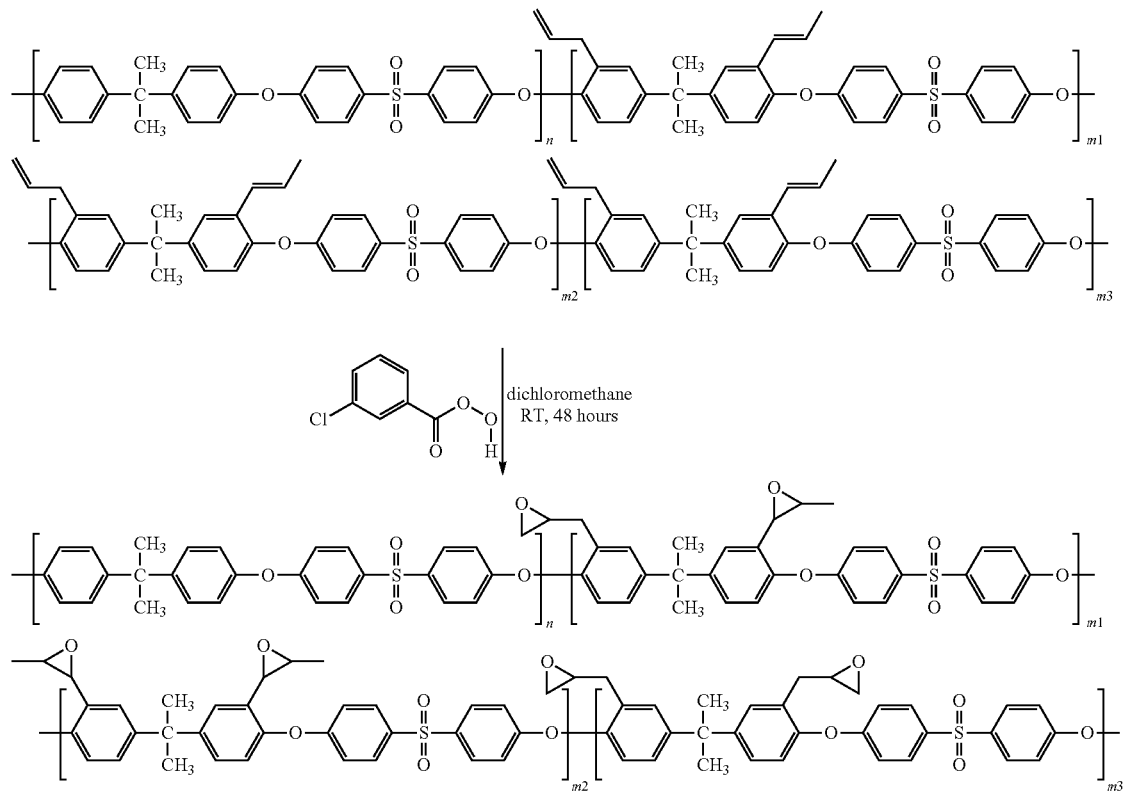
Scheme 3 - Preparation of functionalized PPSU copolymer (P2-B$_1$)
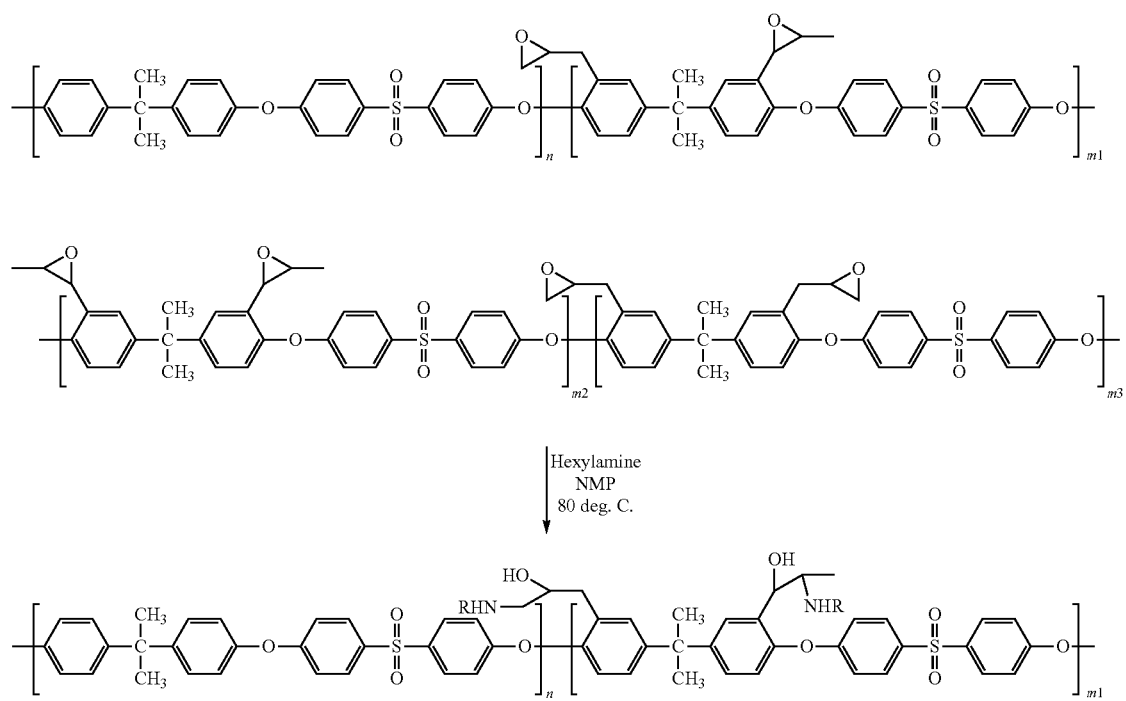

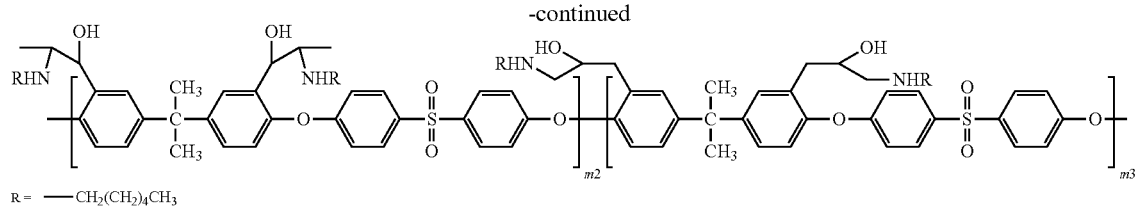
R = —CH$_2$(CH$_2$)$_4$CH$_3$
Scheme 4 - Preparation of functionalized PSU copolymer (P2-B$_2$)
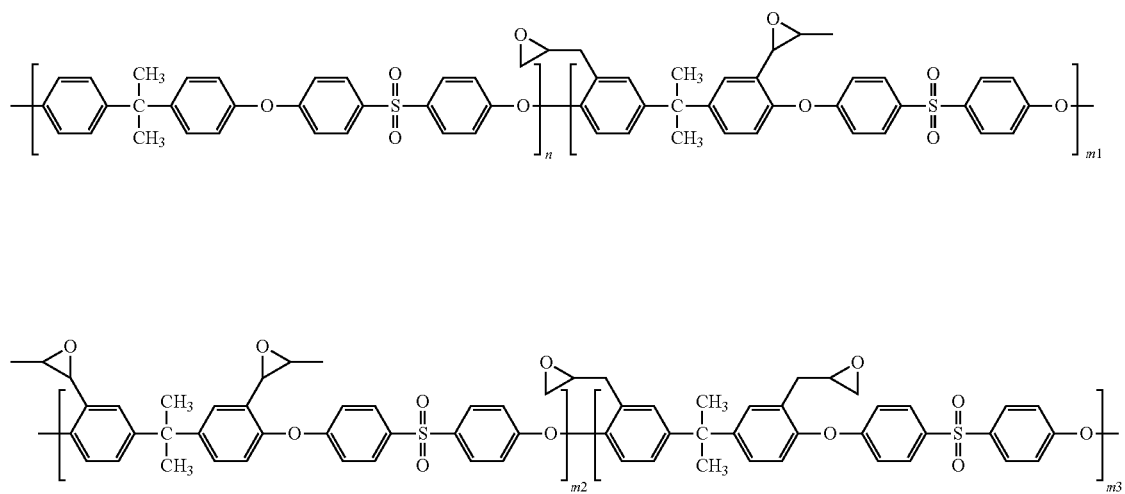
1. Alkaline hydrolysis, KOH, NMP 100 deg. C.
2. Acidification HCl
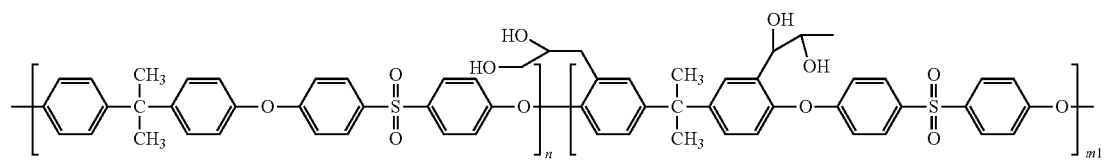
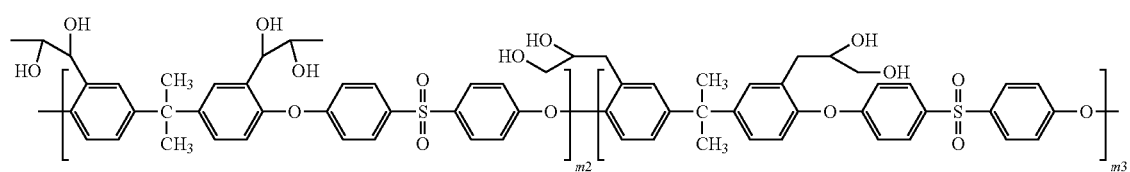

The invention claimed is:

1. A copolymer (P1) comprising:

recurring units ($R_{P1}$) of formula (M):

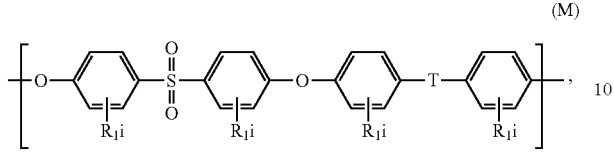

and recurring units ($R^*_{P1}$) of formula (N):

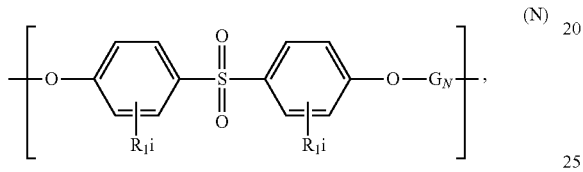

wherein
- each $R_1$ is independently selected from the group consisting of a halogen, alkyl, alkenyl, alkynyl, aryl, ether, thioether, carboxylic acid, ester, amide, imide, alkali metal sulfonate, alkaline earth metal sulfonate, alkyl sulfonate, alkali metal phosphonate, alkaline earth metal phosphonate, alkyl phosphonate, amine and quaternary ammonium;
- each i is independently selected from 0 to 4;
- $G_N$ is selected from the group consisting of the following formulas:

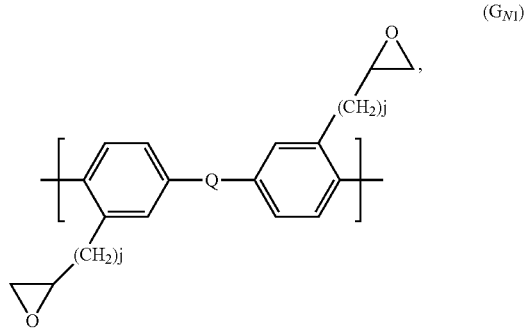

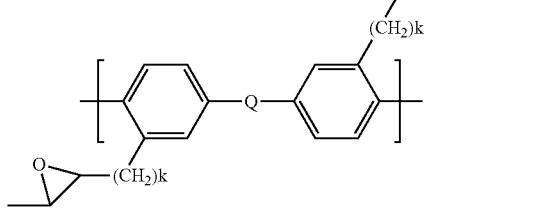

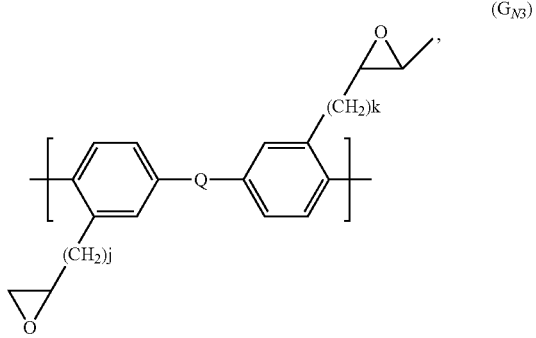

each k is independently selected from 0 to 4;

each j is independently selected from 3 to 7;

T and Q are independently selected from the group consisting of a bond, —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—; —(CH$_2$)$_m$—; —(CF$_2$)$_m$—; a linear aliphatic divalent group of up to 6 carbon atoms, a branched aliphatic divalent group of up to 6 carbon atoms; and combinations thereof, in which each $R_a$ and $R_b$, independently of one another, is hydrogen, a C1-C12-alkyl, a C1-C12-alkoxy, or a C6-C18-aryl group; and in which m is an integer from 1 to 6.

2. The copolymer (P1) of claim 1, wherein T in the recurring units ($R_{P1}$) is selected from the group consisting of a bond, —SO$_2$— and —C(CH$_3$)$_2$—.

3. The copolymer (P1) of claim 1, wherein Q in the formulas ($G_{N1}$), ($G_{N2}$) and/or ($G_{N3}$) of the recurring units ($R^*_{P1}$) is selected from the group consisting of a bond, —SO$_2$— and —C(CH$_3$)$_2$—.

4. The copolymer (P1) of claim 1, wherein i is zero for each $R_1$ of the recurring units ($R_{P1}$) and the recurring units ($R^*_{P1}$).

5. The copolymer (P1) of claim 1, wherein k is 0 and j is 3 in the recurring units ($R^*_{P1}$).

6. The copolymer (P1) of claim 1, wherein the molar ratio of the recurring units ($R_{P1}$)/recurring units ($R^*_{P1}$) varies between 0.01/100 and 100/0.01.

7. The copolymer (P1) of claim 1, wherein the recurring units ($R_{P1}$) are of formula (M1):

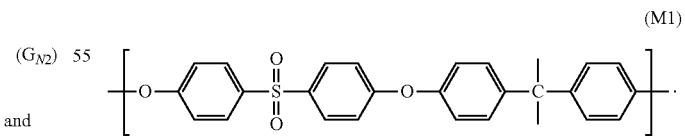

8. The copolymer (P1) of claim 1, comprising collectively at least 50 mol. % of the recurring units ($R_{P1}$) and ($R^*_{P1}$), based on the total moles of the recurring units in the copolymer (P1).

9. The copolymer (P1) of claim 1, having a number average molecular weight (Mn) of less than 20,000 g/mol, as determined by GPC.

10. A process for preparing copolymer (P1) comprising at least partially epoxidizing a copolymer (P0) comprising:

recurring units ($R_{P0}$) of formula (M):

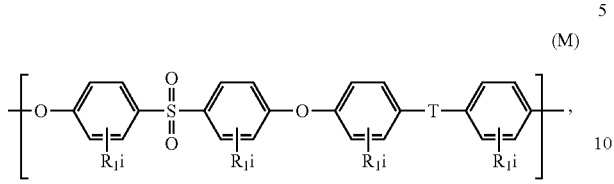

(M)

and recurring units ($R^*_{P0}$) of formula (P):

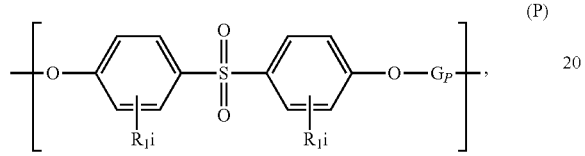

(P)

wherein
each $R_1$ is independently selected from the group consisting of a halogen, alkyl, alkenyl, alkynyl, aryl, ether, thioether, carboxylic acid, ester, amide, imide, alkali metal sulfonate, alkaline earth metal sulfonate, alkyl sulfonate, alkali metal phosphonate, alkaline earth metal phosphonate, alkyl phosphonate, amine and quaternary ammonium;

each i is independently selected from 0 to 4;

$G_P$ is selected from the group consisting of the following formulas:

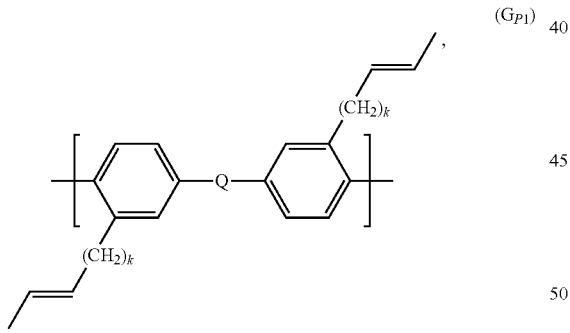

(G$_{P1}$)

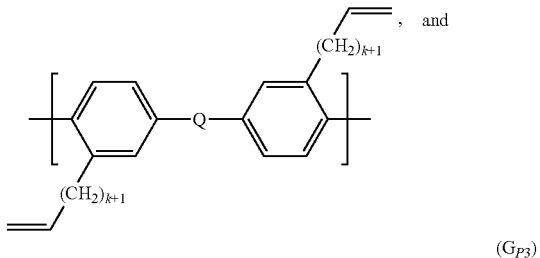

(G$_{P2}$)

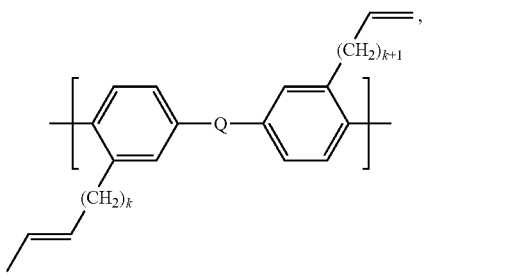

(G$_{P3}$)

each k is independently selected from 0 to 4,

T and Q are independently selected from the group consisting of a bond, —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—; —(CH$_2$)$_m$—; —(CF$_2$)$_m$—; a linear aliphatic divalent group of up to 6 carbon atoms, a branched aliphatic divalent group of up to 6 carbon atoms; and combinations thereof, in which each $R_a$ and $R_b$, independently of one another, is hydrogen, a C1-C12-alkyl, a C1-C12-alkoxy, or a C6-C18-aryl group, and in which m is an integer from 1 to 6.

11. The process of claim 10, being carried out:
in the presence of a peroxy acid, or
with at least one hydrogen peroxide precursor and at least one carboxylic acid or derivative thereof in the presence of water.

12. The process of claim 10, wherein the copolymer (P0) comprises collectively at least 50 mol. % of the recurring units ($R_{P0}$) and ($R^*_{P0}$), based on the total moles of the recurring units in the copolymer (P0).

13. A method for the preparation of a membrane, a composite material or a coating, comprising using the copolymer (P1) of claim 1.

14. An epoxy resin composition comprising at least one epoxy compound and at least one of the copolymer (P1) according to claim 1.

* * * * *